Patented Aug. 14, 1928.

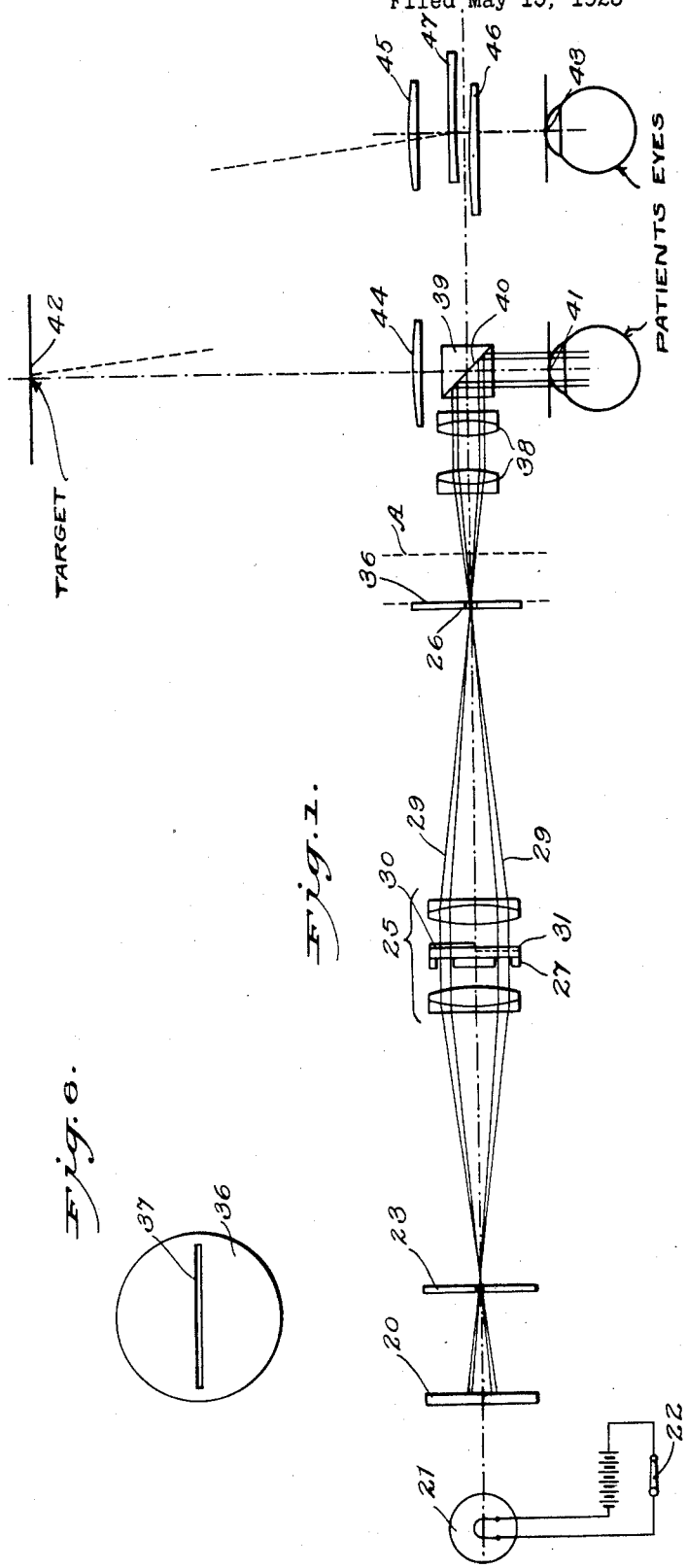
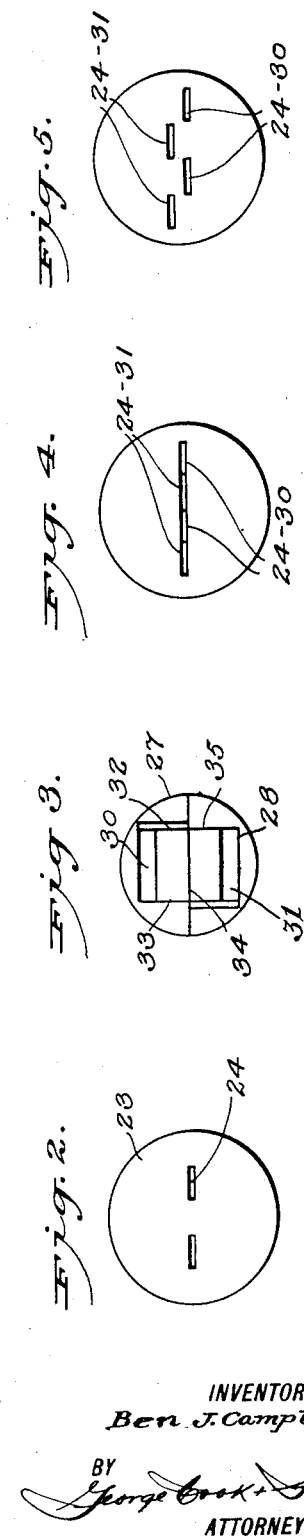

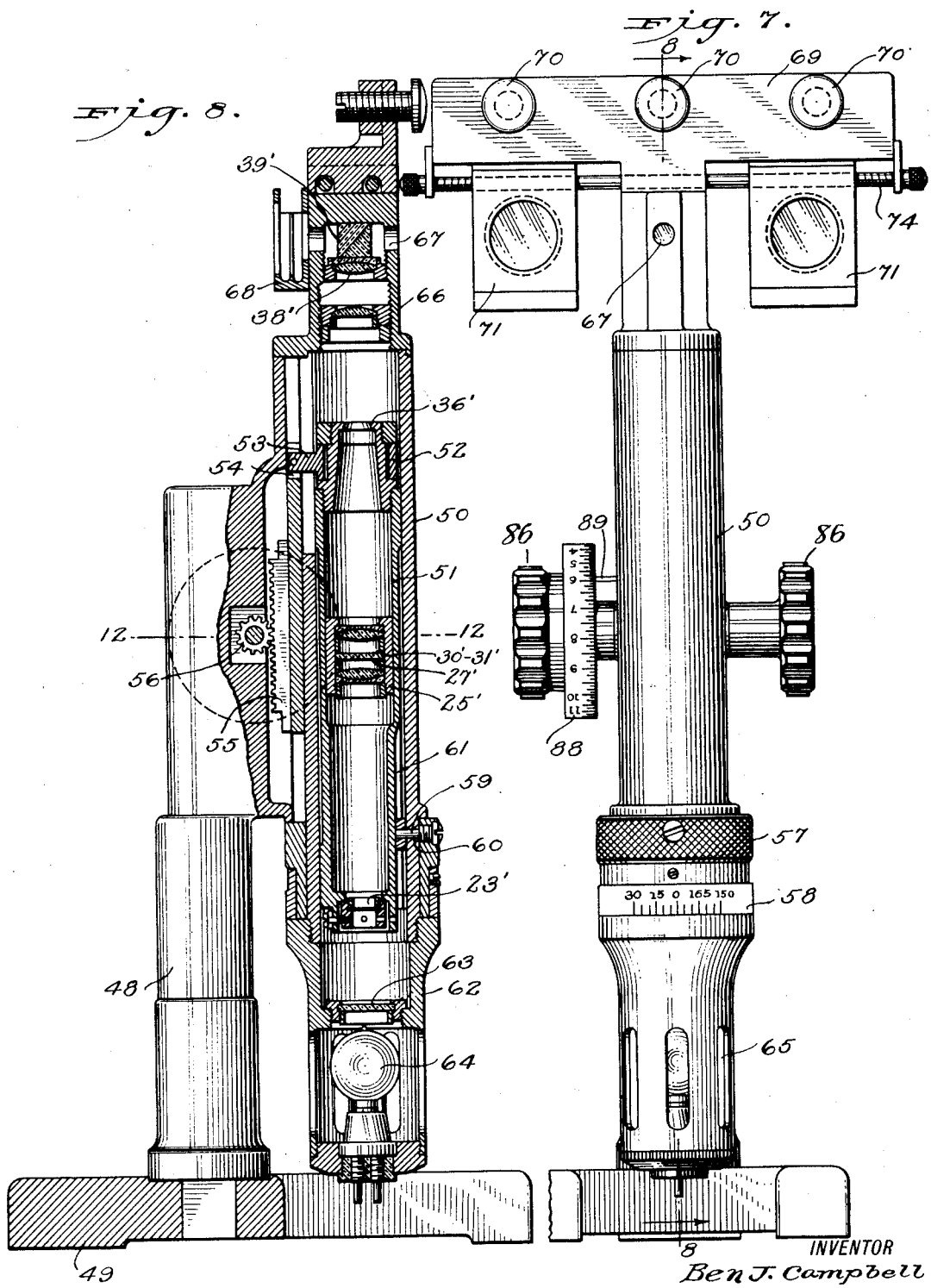

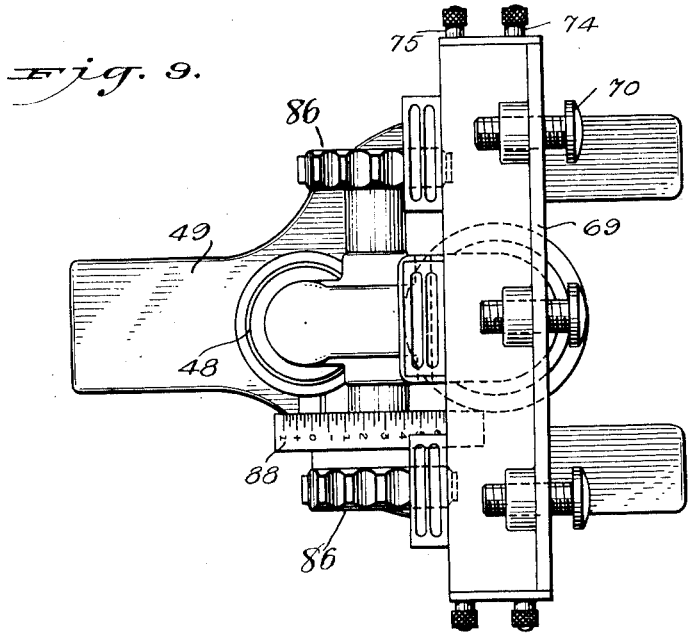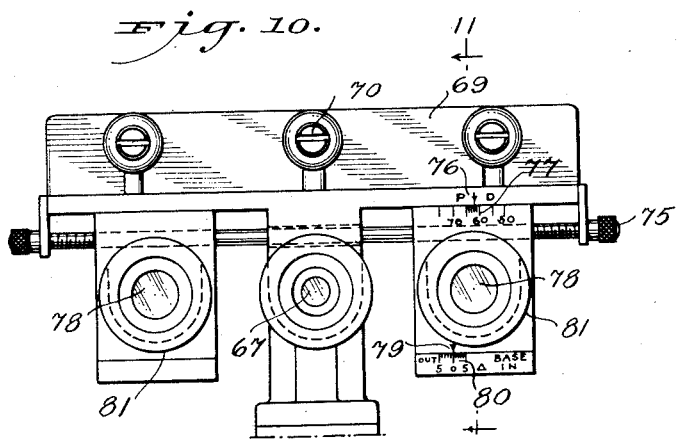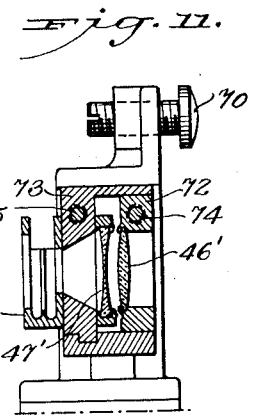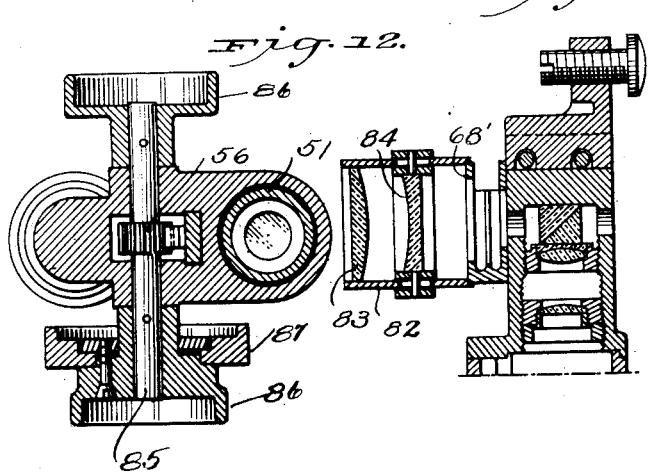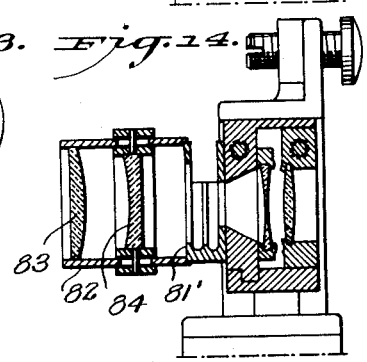

1,680,663

UNITED STATES PATENT OFFICE.

BEN J. CAMPBELL, OF HOBOKEN, NEW JERSEY.

DYNAMIC OPTOMETER AND EYE-TESTING APPARATUS.

Application filed May 15, 1923. Serial No. 639,041.

My invention relates to an apparatus for testing the eyes and has for its object to provide an optical instrument whereby the various errors to which the eyes are ordinarily subject may be easily, readily and precisely measured and the various errors directly readable in spherical, cylindrical, or prismatic diopters, and the principal axes of the eyes indicated in degrees, so that the proper lenses for the eyes under test may be readily prescribed.

More specifically, my invention has for its object to provide an instrument whereby the refractive condition of the eye may be accurately measured and under varying conditions of accommodation or relaxation.

A further object is to provide an instrument for controlling the accommodation, convergence and the muscular condition of the eyes and to accurately measure their refractive condition while so controlled.

A further object is to provide means for causing the eyes to fully relax or accommodate to any indicated and measurable degree and to provide means whereby the refractive condition of the eye when so relaxed or accommodated may be most easily and most accurately measured and so arranged as to prevent any involuntary accommodation or change in accommodation during such measurements.

A further object is to provide an instrument having means for causing the eyes to relax and to measure or indicate the optical strength necessary to produce such relaxation, or to accommodate to any desired extent, and having means for controlling the divergence or convergence of the eyes and measuring the optical strength necessary to produce such convergence or divergence and to provide means for accurately and precisely measuring the refractive condition of the eye when under the indicated degrees of control as above mentioned.

A further object is to provide means for varying the accommodative condition or relaxation of the eyes, for controlling the muscular condition, and therefore the divergence or convergence of the optical axes of the eyes, and to provide improved means for determining the refractive condition of the eye whereby the sense of nearness usually present in optometers is entirely eliminated and the refractive condition therefore more accurately and precisely measured.

A further object is to provide an eye testing apparatus whereby the muscular imbalance of the eyes may be easily and readily tested and the strength of a prismatic lens which will correct or neutralize the imbalance of the two eyes directly indicated in prism diopters, and, further, to provide an optical instrument whereby accurate and precise information and measurements as to the common innervation or harmony or lack of harmony of action between the accommodation and convergence of the eyes may be obtained.

A further object is to accomplish the aforementioned ends in a simple, practical and expeditious manner, and with the foregoing and other objects in view my invention consists in the eye testing apparatus illustrated in the accompanying drawings and hereinafter described and claimed, and in such variations and modifications thereof as will be obvious to those skilled in the art to which my invention relates, it being understood that changes may be made within the scope of what is claimed without departing from the spirit thereof.

An embodiment of my invention is disclosed in the accompanying drawings, wherein:

Figure 1 is a diagrammatic view of the optical system embodying the characteristic features of my invention;

Figure 2 is a plan view of the object diaphragm having the illuminated slits or lines therein;

Figure 3 is a plan view of the second diaphragm having the decentralized slits and with the longitudinally displacing prisms;

Figure 4 is a diagrammatic view of the image of the slits or lines of the object diaphragm at the conjugate focus of the latter;

Figure 5 is a similar view at either axial side of the conjugate focal plane and showing the longitudinal displacement and lateral separation of the images of the object slits or lines;

Figure 6 is a plan view of a diaphragm which may be located at the focal plane or conjugate focus of the objective lens;

Figure 7 is a view in front elevation of a complete optical instrument embodying the characteristic features of my invention;

Figure 8 is a view in vertical section taken on the line 8—8 of Figure 7;

Figure 9 is a top plan view of the foregoing;

Figure 10 is a view in elevation of the rear or back of the upper portion of my optical eye-testing instrument;

Figure 11 is a fragmental view in vertical section taken on the line 11—11 of Figure 10;

Figure 12 is a view in horizontal section taken on the line 12—12 of Figure 8;

Figure 13 is a fragmental view in section of a modified form of apparatus for mensuratively controlling the accommodation of the eye under test; and Figure 14 is a fragmental view in section of a modified form of apparatus for mensuratively controlling the second eye or eye the refractive condition of which is not being measured.

In order that the refractive condition of the eye may be measured under varying degrees of accommodation or when completely relaxed, I provide an optical system as diagrammatically illustrated in Figure 1, wherein a diffusion screen 20 is illuminated by the electric lamp 21, the latter being controlled by a suitable switch 22, so that it may be flashed on or off as desired. It is to be understood that the light upon the diffusion screen may be controlled in other ways than by turning off and on the switch 22, as, for example, a shutter could be placed between the lamp and the diffusion screen, such changes and modifications, however, coming clearly within the scope of my invention; the results being the same whether the light is turned off by a switch or a shutter is closed. The diffusion screen 20 may partake of the nature of a light filter so as to transmit only monochromatic light, if it be so desired. Located adjacent the diffusion screen 20 is the diaphragm 23, the same being provided with two or more spaced aligned slits 24 (as illustrated in Figure 2) through which the light from the diffusion screen 20 may pass, and the slits thus partake of the nature of an illuminated object or line.

An objective lens or lens system 25 is so placed with relation to the object diaphragm 23 that a real image of the object slits or object lines 24 will be formed at the focal plane 26. Associated with the objective lens system 25 is the ray selecting screen 27 which is an opaque diaphragm provided with two or more laterally displaced slits 28 of such width that a sharp image of the object slits 24 will be formed at the focal plane 26 of the objective lens and at both sides of the exact focal plane, and, further, the image will be formed by the spaced and converging rays 29, all other rays being shut off by the opaque portion of the diaphragm 27.

In this regard I wish to point out that the ray selecting screen 27 may partake of other forms, as, for example, it may partake of the nature of an opaque paint applied directly to one of the lenses of the objective system and having the spaced or laterally displaced slits 28. Associated with the objective system 25 and preferably attached to the ray selecting screen, are the two prisms 30 and 31, the base of the prism 30 being 30 and 31, the base of the prism 30 being represented by the line 32, and the apex of the prism by the line 33 in Figure 3, and the base of the prism 31 represented by the line 34 and the apex of this prism by the line 35. The real image formed at the focal plane 26 by this lens prism and ray selecting screen system is illustrated in Figure 4, wherein the images 24—30 are formed by the ray through the prism 30, and the longitudinally offset but aligned images 24—31 are formed by the ray through the prism 31. If the eye-piece is focused at either side of the focal plane, such as, for example, at A, in Figure 1, there will be a lateral displacement of the images 24—30 and 24—31, as illustrated in Figure 5, and as the focal plane A of the eye-piece is moved toward or away from the focal plane 26, the images 24—30 and 24—31 will appear to move in a lateral direction and will come into exact alignment at the exact focal plane, as illustrated in Figure 4. It is to be noted that a single prism may be used to produce the longitudinal displacement of the images, and, further, one of the slits 28 of the ray selecting screen could coincide with one of the principal axes of the lens should it be so desired, such changes and modifications coming clearly within the scope of my invention.

A focal plane diaphragm 36 may be placed as illustrated in Figures 1 and 6 for cutting out internal reflections and defraction bands.

An eye-piece or lens system 38 acts in the customary manner to form a real image of the focal plane image upon the retina of the eye of the observer or patient. In order that the eye under test may perceive a distant chart and at the same time be conscious of the alignment or lack of alignment of the images 24—30 and 24—31, I provide the reflecting and transmitting prism 39, the same being formed of two prisms cemented together and with a half tone silvering 40 on one of the cemented surfaces, although the same effect may be obtained in other ways, such as, for example, the use of a thin plane glass reflector or a double reflecting half tone prism with which the axis of the object-viewing-system may make an acute angle with the line of sight to the distant chart. Thus with the eye of the observer at 41, a distant chart or target 42 may be readily perceived and the eye accommodated or relaxed therefor, and at the same time will be conscious of the illuminated images 24—30 and 24—31, which thus form what I term a local object. As previously mentioned, the diffusion screen 20 may partake of the nature of a light filter and transmit only monochromatic light and I have found that red is preferable, as the eye under test shows less tendency to accommodate for red than for white or any other color. It is also noted that excellent results are obtained when the distant chart is provided with a dark blue ground upon which the red lines of the local object are readily seen or superimposed.

As is well known by users of the ophthalmoscope a certain percentage of the light from the local object, which is brought to a focus on the patient's retina, is reflected, and if the local object is sufficiently illuminated this reflex can be seen by the examiner merely by placing his eye in front of the patient's eye, in the line of sight to the distant chart, or by deflecting this reflex into his own eye by a suitable reflecting system, hence, the examiner can also see for himself when the alignment is effected. This direct determination by the examiner, which may be called an objective method, is within the scope of this invention.

The second eye of the patient will be placed so that the visual axis will lie in a plane at an angle to the plane of the drawing but for purposes of illustration in Figure 1 this position has been rotated through 90°, so that the second eye will be placed at 43. Suitable test or fogging lenses 44 and 45 may be placed in the visual axes of the eyes and thus the eyes caused to accommodate or to relax to any desired and measurable degree and while so accommodated or relaxed their refractive condition accurately measured by moving either the objective lens system 25 or the eye-piece system 38 until the eye which is placed at 41 and accommodated or relaxed for the distant chart or distant object will be conscious of the apparent alignment of the local object. The means for varying the relative position of the eye-piece and objective lens is provided with a suitable dioptic scale, so that direct readings as to the refractive condition of the eye may be made.

Placed in front of the second eye position 43 is a positive lens 46 and an equally strong but negative lens 47, so that a neutral effect is obtained by the two lenses when centrally aligned but whereby a prismatic effect is obtained when the lenses are decentralized. With the eyes at the positions 41 and 43, the chart 42 may be made to move horizontally relative to the object lines by decentralizing the lenses 46 and 47 and thus the muscular imbalance of the eyes tested, and, further, I am able to make accurate and precise measurements as to the harmony or lack of harmony between the accommodative condition of the eye and the convergence of the visual axis. It is obvious that other means may be utilized, within the scope of this invention, to cause the chart to apparently move either horizontally or vertically relative to the local object line. Such means could easily partake of the well-known double oppositely rotating wedges or prisms such as used in standard phorometers.

The practical embodiment of my invention in a complete eye-testing instrument is disclosed in Figures 7 to 14, wherein a column 48 is mounted upon a suitable base or pedestal 49 and rigidly supports a tubular housing 50, and in which latter is slidably mounted the objective lens carrier 51. The objective lens carrier 51 is provided at its upper extremity with the swivel or rotatable ring 52 having the offset arm 53 which rides in a suitable slot 54 formed in the tubular housing 50, and to which offset arm is connected the rack 55, the latter in turn meshing with the pinion 56, so that as the latter is rotated the objective lens carrier 51 will be raised and lowered within the tubular housing. An objective lens system 25′ is mounted within the carrier 51 and with which is associated the deviating prism 30′—31′, and with the ray selecting screen 27′, the various parts corresponding to the similar and unprimed numerals of the optical system illustrated in Figure 1. At the lower extremity of the carrier 51 is the object diaphragm 23′, while at the remote extremity of the carrier and located at the focal plane of the objective lens system is the diaphragm 36′. A knurled ring 57 is rotatably mounted upon the tubular housing 50, carries a suitably graduated scale 58, and, by means of the pin 59 traveling in a suitable lateral slot 60 in the tubular housing and a longitudinal slot 61 in the objective lens carrier, is adapted to turn the carrier 51 and associated parts so that the object slits 24, as illustrated in Figure 2, will be turned or rotated and thus the refractive condition at the various meridians of the eye tested. Threadedly secured to the lower extremity of the tubular housing 51 is the sleeve 62 which carries the diffusion screen and ray filter 63 and below which is mounted the source of illumination or electric lamp 64, there being suitable openings 65 in the sides of the sleeve 62 adjacent the electric lamp to prevent undue heating of the instrument.

Fixedly secured to the upper extremity of the tubular housing 50 is the tubular member 66 having a horizontal aperture 67 extending entirely therethrough and in alignment with which and contained within the tubular member is provided the combination reflecting and transmitting prism 39′ and directly beneath which is rigidly mounted the eye-piece or eye lens system 38′. Directly behind the tubular member 66 is placed the test or trial lens support 68, so that the eye in looking through the aperture 67 to a distant chart may be caused to look through suitable lenses contained within the lens carrier 68. A cross bar 69 is mounted upon the upper extremity of the tubular member 66 and in addition to acting as a support for the head rest members 70 also serves as a support for the lens or prism carriers 71 and through which the other eye of the patient is directed. The lens or prism carriers are, as illustrated in Figures 10 and 11, each made up of the relatively slidable frames 72—73, each frame supporting a lens 46'—47', and the sliding frames are threadedly mounted upon the threaded cross rods 74 and 75, the rods being threaded right and left at opposite ends, so that as the rods 74 or 75 are turned the frames and lenses carried thereby will be caused to approach or recede away from the aperture 67 through which the eye under test is being directed. Upon the rear of the cross bar is placed an index point 76 and upon the frame 73 is inscribed a suitable scale 77 laid out in terms of the pupilary distance of the eye, so that as the threaded rod 75 is rotated the distance between the central aperture 78 of the lens or prism carriers and the aperture 67 is made equal to the pupilary distance of the eyes of the patient. The lens carrying frame 72 is provided with an index pointer 79 which operates in conjunction with a scale 80 laid out upon the frame 73 and thus as the rod 74 is rotated the decentralizing of the positive and negative lenses 46' and 47' will produce a prismatic effect and directly readable in prism diopters on the scale 80.

A test or trial lens support 81 is mounted upon the rear of each of the lens carriers 71 and provides for additional optical power, either in the way of lenses, cylinders or prisms, as may be desired. In addition to the test or trial lens supports 68, as illustrated in Figure 8; and 81, as illustrated in Figures 10 and 11, I may use a variable lens system as illustrated in the modified forms in Figures 13 and 14, wherein a positive lens 83 is held stationary within the tubular support 82, and the negative lens 84 shiftably mounted within the tubular support and a suitable scale (not shown) provided so that the optical strength of the two lenses may be directly indicated and when so desired suitable test lenses may be mounted within the trial or test lens supports 81' or 68'.

The pinion 56, as illustrated in Figure 8, and perhaps more clearly in Figure 12, is mounted upon the shaft 85 and upon the outer extremities of which latter are mounted the knurled knobs 86. A suitable drum 87 is secured to the shaft 85 and has a scale 88 inscribed thereon preferably readable directly in diopters, so that as the knurled knobs 86 are turned and the objective lens 51 moved toward or away from the eye-piece or eye lens, a direct measurement of the refractive condition of the eye may be obtained. A suitable index or pointer 89 is used in connection with the dioptic scale 88 and the relative position of the eye lens and objective lens thus indicated.

With my improved eye testing instrument as thus constituted, the extremely accurate measurements as to the refractive condition of the eye may be made and under varying degrees of accommodation or relaxation. The eye is particularly sensitive to the alignment of two or more objects, so that although the eye under test perceives the distant object or chart and is accommodated or relaxed therefor, or accommodated or relaxed to a measurable degree by means of test lens inserted in the support 68 or by means of the variable optical system as illustrated in Figure 13, it is at the same time conscious of the bright and sharply defined lines or slits. As the knobs 86 are rotated, the images 24—30 and 24—31 appear to move laterally one set with relation to the other, and when in exact alignment and to which the eye is especially sensitive, the refractive condition of the eye will be directly indicated upon the dioptic scale 88 and suitable lenses for the correction of any error which may be thus found in the eye under test readily prescribed. Further, an opaque diaphragm may be placed within the trial or test lens support 68, and the rotation of the rod 74 will cause the chart to apparently move across the local object lines and the muscular imbalance of the eyes accordingly read directly from the prism dioptic scale 80. Further, all of the foregoing refractive tests may be carried out in the various meridians of the eye by rotating the knurled ring 57 and the principal axes of the eyes obtained from the highest and lowest readings. Further, I am able to obtain precise and exact information not only as to the refractive condition of the eye under varying and measurable degrees of accommodation or relaxation, but also under varying degrees of muscular control and to obtain other and valuable information concerning the eyes, such as, for example, the harmony or lack of harmony of action or associated innervation between the accommodation and convergence of the eyes and have thus provided means whereby the oculist is better able to prescribe the correct lenses for the eyes of the patient than has heretofore been possible.

Having thus described and explained my invention, I claim and desire to secure by Letters Patent:

1. In an eye testing instrument the combination of means whereby the eye under test may at one and the same time perceive a distant chart and a local object or image, means associated with the vision by both eyes of the distant chart for controlling the accommodative condition of the eye, mensurable means for controlling the muscular condition of the eyes with regard to the visual axes thereof, and means for then measuring the refractive condition of the eye.

2. An eye testing instrument comprising means whereby one eye may view a distant chart and the other eye a local object or image, and mensurable means associated with the vision of the distant chart whereby the apparent relative position of the local and distant objects or images may be varied, and the muscular condition and relation of the visual axes of the eyes measured.

3. An eye testing instrument of the character described comprising binocular means for viewing, a distant chart, prismatic means for controlling the relative visual axes of the patient's eyes, and an illuminated local object of line like proportion, an objective lens, a ray selecting screen associated with said objective so that an image is formed by angularly disposed rays, and an eye-piece for use in connection therewith and adjustable with respect to the objective and adapted to indicate and measure the refractive condition of the eye by its relative position with the objective.

4. An instrument of the character described comprising means for viewing a distant chart with both eyes, prismatic means for controlling the relative visual axes of the patient's eyes, binocular means for fogging to any desired extent the vision of said chart, and an illuminated local object partaking of the nature of a red line of limited length and small cross section, an optical system in connection therewith whereby a double image of the object is formed and said images longitudinally displaced, and an eye-piece adapted to cause the apparent relative lateral movement of said images formed on the patient's retina and objective means to indicate the refractive condition of the observing eye when the said double images are in exact alignment.

5. An eye testing instrument comprising an illuminated local object, an objective lens system associated therewith, means associated with said objective lens system adapted to form a double image of said local object by laterally displaced, limited, and angularly disposed rays, an eye-piece, a half tone prism system through which a distant chart may be viewed, means whereby the image is shifted through the conjugate focus of the eye-piece for the alignment of the images to thereby indicate the refractive condition of the observing eye, mensurable binocular means for controlling the accommodative or relaxed condition of the observing eye irrespective of the local object, and binocular means for controlling the convergence of the two eyes of the observer.

6. An eye testing instrument comprising an illuminated local object, an objective lens system associated therewith, means associated with said objective lens system adapted to form a double image of said local object by laterally displaced, limited and angularly disposed rays, an eye-piece, means whereby the image of the object is apparently shifted through the conjugate focus of the eye-piece and the eye under test for the alignment of the images to thereby indicate the refractive condition of the observing eye, binocular means for controlling the accommodation or relaxation of the observing eye, and mensurable means for controlling the convergence of the visual axes of the two eyes of the observer.

7. In an optometer, a fixation chart, placed at any suitable distance from, and in front of the instrument, means for viewing this chart through the instrument with both eyes, a lens system interposed between each eye and the chart, means for varying the strength of the lens system, whereby the chart is fogged, placed at apparent infinity, or any desired apparent near position, prismatic means for diverging or converging the relative visual axes of the eyes thereby aiding the eyes to relax to their remote point, or to accommodate to any desired extent, and independent mensurable means by which the examiner can determine to what point the eye under test did relax or accommodate.

8. In an optometer means, for binocularly viewing a fixation chart, optical means for varying the apparent distance of the chart, or fogging same, prismatic means for controlling the visual axis of the patient's eye not under test relative to the other eye being tested, and in combination, means by which the examiner can determine, expressed in suitable units, that point to which the eye under test did relax or accommodate, said means comprising, an illuminated slit or slits, a lens system, and associated therewith a prism or prisms, and a diaphragm having a plurality of slits, the said lens system, prism or prisms, and diaphragm adapted to bring to a focus the light rays from the illuminated slit, the image of which is formed by narrow pencils, in such manner that at the focal plane, a straight line (or lines) is imaged, but at a short longitudinal distance from the focal plane, broken lines appear, an eyepiece, mensurable means for varying the position of the image relative to the eyepiece, a half tone prism system, having one or more reflections, which diverts the rays from the local system, and passes direct the light rays from the fixation chart.

9. An eye-testing instrument comprising means whereby both eyes of an observer may binocularly view a distant chart, mensurable means for fogging the view of the chart, and mensurable means for controlling the convergence of the visual axes of the eyes of the observer to thereby cause full relaxation of the accommodative function, and in combination therewith independent means for measuring the point (in dioptres or other suitable scales) to which the eye under test relaxes while so controlled.

10. An eye-testing instrument comprising means whereby both eyes of an observer may binocularly view a distant chart, mensurable means, associated with the eye not under test, for fogging the view of the chart, and mensurable means for controlling the convergence of the visual axes of the eyes of the observer to thereby cause full relaxation of the accommodative function, and in combination therewith independent means for measuring the point (in dioptres or other suitable units) to which the eye under test relaxes while so controlled.

11. An eye-testing instrument comprising means whereby both eyes of an observer may binocularly view a distant chart, mensurable means, associated with the eye not under test, for fogging the view of the chart, and mensurable means for controlling the convergence of the visual axes of the eys of the observer to thereby cause full relaxation of the accommodative function, and in combination therewith independent means for measuring the point (in dioptres or other suitable units) to which the eye under test relaxes while so controlled, said independent means including an illuminated local object, and means whereby the said local object or an image thereof may be adjusted in accordance with the refractive condition of the eye under test and measure and indicate the point of fixation thereof.

12. An eye testing instrument comprising means whereby one eye may view a distant chart which is fogged to any desired extent, means whereby the other eye may view a local object or image thereof, means of deflecting the line of sight to the distant chart so that the local object is apparently superimposed upon it, and mensurable means of indicating the relative convergence or divergence of the visual axes while chart and local object are so superimposed.

13. An eye testing instrument, binocular means for viewing a distant chart, means for fogging to any desired extent the vision of said chart, means for the muscular control of the visual axis, and means for indicating and measuring the refractive condition of the eye under test while viewing the distant chart, the latter measuring means comprising an illuminated object, an objective system having ray-selecting and ray-deviating elements, an image plane, an eye-piece, a half tone ray-deflecting prism system behind said eye-piece through which the eye under test may view the distant chart, and mensurable means for moving said object and objective system as a unit relative to the eye-piece system.

14. An eye-testing instrument comprising a distant chart, binocular means for viewing this chart, means for fogging to any desired extent the said chart, and means for the muscular control of the visual axes of the eyes of the observer, and means for indicating and measuring the refractive condition of the eye under test while so viewing the distant chart, the latter measuring means including a source of light, a ray filter, an opaque screen with suitable slots, an objective system having ray-selecting and ray-deviating elements, an image plane, an eye-piece, a half tone ray-deviating system behind said eye-piece, and mensurable means for moving said object and objective system as a unit relative to the eye-piece system.

15. An eye-testing instrument comprising binocular means for controlling the accommodation of the eyes in viewing a distant chart, means for controlling the divergence or convergence of the visual axes while viewing said chart, independent means for measuring, in any meridian, the point to which the eye under test did relax or accommodate while so controlled, said independent means comprising a source of light, means for controlling the duration of exposure of said light, a line-like object, an objective system associated therewith, a ray-selecting screen, a ray-deviating prism system, mensurable means for rotating said object, an objective system about a vertical axis, mensurable means for shifting said object and objective system parallel as a unit parallel to this axis, an eye lens system, a half tone prism system adapted to reflect rays from the latter measuring means and prism rays from the first-named controlling means.

Signed at Hoboken in the county of Hudson and State of New Jersey this 11 day of May A. D. 1923.

BEN J. CAMPBELL.